Figure 1:
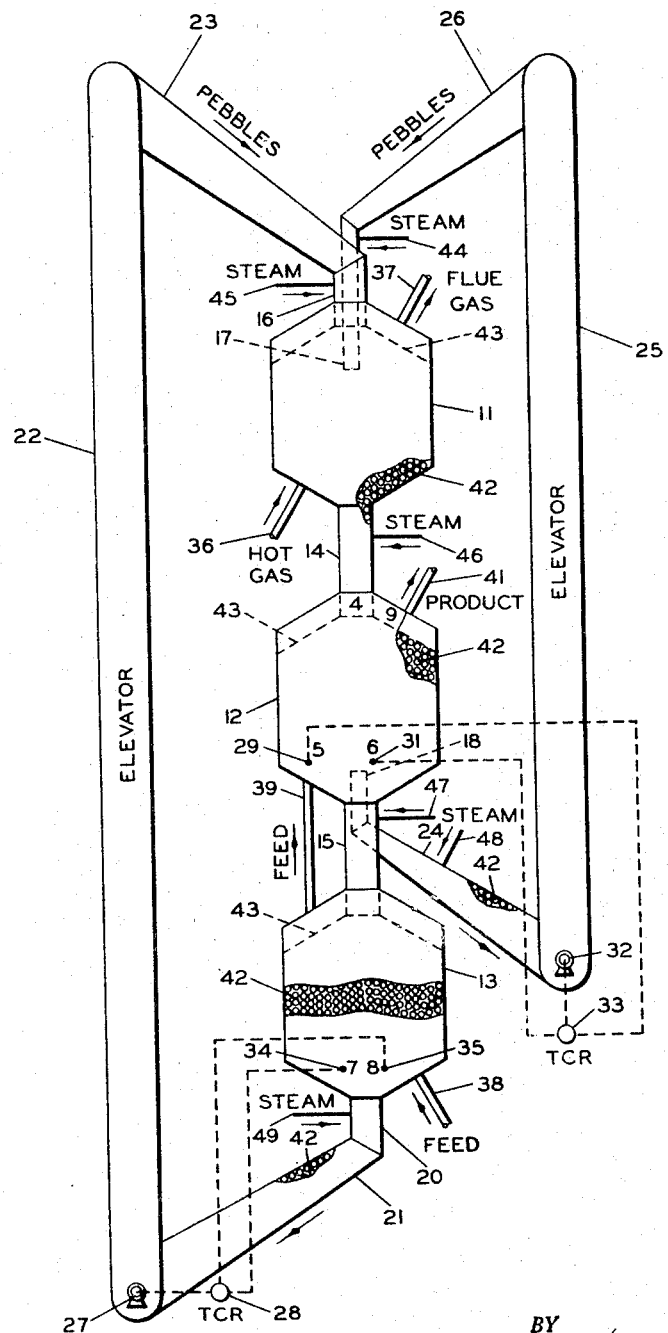

Dec. 16, 1947.    B. J. FERRO, JR., ET AL    2,432,873
MEANS OF PEBBLE HEATER CONTROL
Filed Aug. 25, 1947    2 Sheets-Sheet 1

INVENTORS
J. F. CHURCH
B. J. FERRO, JR.
BY *Hudson & Young*
ATTORNEYS

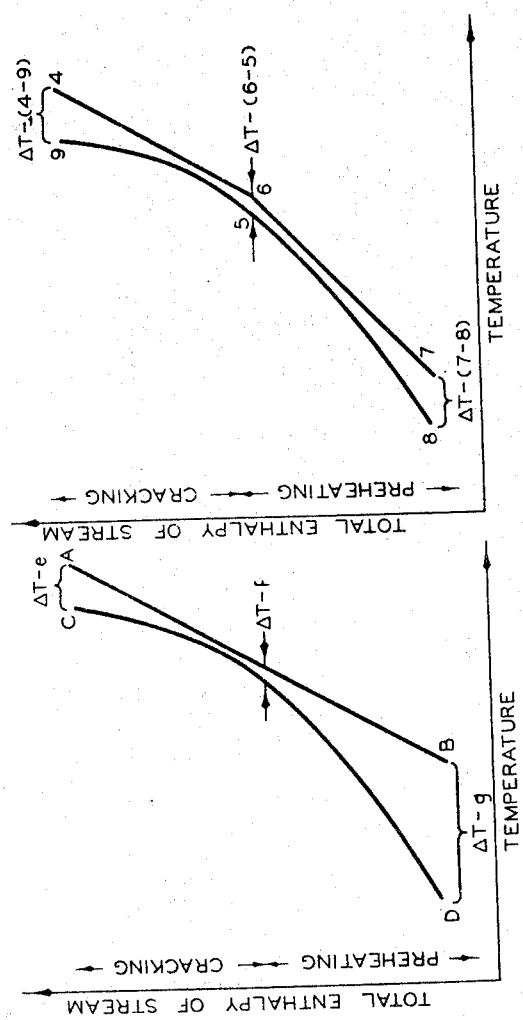

Patented Dec. 16, 1947

2,432,873

UNITED STATES PATENT OFFICE 2,432,873

MEANS OF PEBBLE HEATER CONTROL

Bernardo J. Ferro, Jr., and J. Frank Church, Bartlesville, Okla., assignors to Phillips Petroleum Company, a corporation of Delaware Application August 25, 1947, Serial No. 770,484

13 Claims. (Cl. 196—55)

This invention pertains to an improved process and apparatus for heating gases by contact with a descending stream of hot pebbles. A specific aspect of the invention relates to a process and apparatus for high temperature conversion of hydrocarbons.

Pebble heater operation with which this invention is concerned is being utilized in a variety of chemical processes and treatments in which extremely fast heating of the gas is required. Its application includes conversion of hydrocarbons at high temperatures, such as cracking and dehydrogenation, the synthesis of HCN from $NH_3$ and CO, the synthesis of $CS_2$ by reacting hydrocarbon vapors with sulfur containing gases, etc. Conventional pebble heater technique entails circulating a continuous mass of pebbles by gravity through a series of chambers or zones, elevating them to a point above the upper chamber, and again allowing them to descend by gravity through the several chambers. In a typical hydrocarbon conversion process pebbles are heated in an upper chamber by contact with a countercurrent stream of hot flue gas after which they pass into a conversion chamber where they heat the hydrocarbons being processed and supply the heat of reaction required. In many installations a third chamber is positioned below the conversion chamber to effect the preheating of the feed stock. Pebbles emerging from this third zone are sufficiently cool to be handled in ordinary carbon steel elevator equipment. In some processes, instead of preheating the feed in the third chamber, air or fuel for combustion purposes in connection with the pebble heating chamber are circulated through the lower chamber to be preheated and to cool pebbles therein. It is in pebble heater operation involving a gas preheating step in a third chamber with which this invention is concerned.

In processes in which the fluid stream being treated undergoes a physical or chemical reaction accompanied by an appreciable change of specific heat, some difficulty is encountered in regulating and controlling the temperature differential between the pebble and fluid streams. The same difficulty is encountered when there is a large difference between the specific heats of the fluid and pebble streams. In endothermic reactions, e. g., the differential between inlet pebble temperature and outlet gas temperature in the reaction chamber must be relatively high in order to transfer sufficient heat to the reaction chamber to effect the process desired. It is also desirable that there be substantial difference between outlet pebble temperature and inlet gas temperature. This means that the pebbles entering the preheating chamber are at a relatively high temperature and, since the volume of gas being preheated is the same as that being reacted, the heat exchange between the pebble stream and the fluid stream in the preheating chamber does not lower pebble temperature to the proximity of inlet gas temperature. This means a relatively high differential between gas inlet temperature and pebble outlet temperature in the preheating chamber. Such high differential between pebble and fluid temperatures results in large superficial thermal stresses and subsequent breaking of pebbles. It also results in less efficient utilization of heat in pebble heater operation. It is with these difficulties that the present invention is concerned.

This invention is related to the invention of application Serial No. 704,694 by B. J. Ferro, Jr., and provides more simple and direct control of temperature differentials than is provided by the invention therein as will be pointed out hereinafter.

It is an object of the present invention to provide a means for regulating and controlling the temperature approach or difference between the pebble and fluid streams in a pebble heater where the latter stream undergoes a physical or chemical reaction accompanied by an appreciable change of specific heat or where there are large differences between the specific heat of the fluid and pebble stream. It is also an object of the invention to reduce or eliminate pebble breakage in pebble heater operation. A further object of the invention is to provide for more efficient operation of a pebble heater by permitting closer correlation between pebble and fluid stream temperatures. It is also an object of the invention to prevent temperature lock of the two streams and at the same time prevent extremely large temperature differences either at the top or bottom of the heater.

The term "pebble" as referred to throughout the specification is defined as any particulate refractory contact material which is readily flowable through a contact chamber. Pebbles are preferably spherical in form, and range from about ⅛ inch to 1 inch in size, but spheres ranging in size from about ¼ inch to ½ inch are the most practical. Uniform shapes and sizes are preferred but pebbles of irregular shape and size may be used. Pebbles may be made of ceramic material, such as alumina, or of metals and alloys, such as iron, nickel, monel, and inconel.

While the invention has its greatest applicability in the conversion of hydrocarbons it is not so limited but is applicable to any pebble heater process enhanced by careful control of pebble and fluid temperature differentials.

The invention provides for the removal of a separate stream of pebbles from the main pebble stream near the bottom of the reaction chamber and transfer of this separate pebble stream to the pebble heating chamber. Thus, by permitting only a portion of the pebble stream to flow through the preheating chamber, the differential between feed inlet temperature and pebble outlet temperature in the preheating chamber may be accurately controlled in a low range. The flow rate of the pebble stream removed from the bottom of the reaction chamber is controlled in accordance with a predetermined temperature differential between pebble outlet temperature and feed gas preheat temperature in the lower portion of the reaction or conversion chamber. The flow rate of the main pebble stream through the preheating chamber is regulated in response to a predetermined temperature differential between the feed inlet temperature and the pebble outlet temperature in the preheating chamber.

In order to facilitate understanding of the invention reference is made to the drawing of which Figure 1 is an elevational view partly in section of a preferred arrangement of apparatus according to the invention. Figure 2 is a graphic representation of the relation between the temperature and total enthalpy of a pebble and fluid stream in a typical pebble heater hydrocarbon cracking process without stepwise removal of pebbles. Figure 3 is a graphic representation of the temperature-enthalpy relation of the same two streams, but with removal of a portion of the pebble stream after the cracking operation takes place and before the pebble stream descends into the preheating zone.

Referring to Figure 1, numerals 11, 12 and 13 designate a pebble heating chamber, a gas treating or conversion chamber, and a gas preheating chamber, respectively, connected by throats 14 and 15 and vertically arranged for gravity flow of pebbles therethrough. Pebbles 42 are introduced to pebble heating chamber 11 through conduit 16 and 17 concentrically arranged. Pebble inlets 16 and 17 may open into heater 11 in other positions than that shown and need not be contiguous. While passing through heater 11 the pebble stream is contacted with hot combustion gas fed into the chamber through line 36 and egressing through stack 37. The hot pebble stream entering conversion chamber 12 is contacted by preheated gas entering the chamber through line 39 and supplies the heat requirements of the process in this chamber. Effluent products from chamber 12 are taken off through line 41 which leads to treating apparatus not shown. During passage of the partially cooled pebbles through preheating chamber 13 they are contacted in countercurrent flow with a stream of feed gas admitted through line 38 and taken off through line 39 which leads into chamber 12. The relatively cool pebble stream is taken off through line 20 and chute 21 which leads to elevator 22. Elevator 22 lifts the pebbles to a point above heating chamber 11 and drops them into chute 23 from which they are delivered into pebble inlet 16 and again flow into the heating chamber.

As an alternative arrangement, the lower portion of heating chamber 11 may serve as a combustion zone for a combustible mixture of fuel and oxygen-containing gas fed into the zone by a suitable burner or plurality of burners, such as that disclosed in application Serial No. 787,413, filed November 21, 1947, by L. J. Weber. A preferred method of operation is to maintain a substantially constant temperature in the pebble stream in throat 14 by regulating the temperature and/or the quantity of hot combustion gas passing through the heater 11.

Outlet 18 and chute 24 serve to withdraw a separate stream of pebbles from the lower part of reactor 12. Elevator 25 lifts this stream of pebbles to a point above heating chamber 11 and drops them into chute 26 from which they flow through inlet 17 into heating chamber 11. Pebble inlet 17 is preferably extended into the heating chamber to a point at which the pebble temperature is approximately that of the separate stream of pebbles being introduced. Throats 14 and 15 and pebble inlet 16 extend into their respective chambers a short distance in order to provide a small vapor space above the pebble bed which has a conical top 43 in each of the chambers. Pebble throats and chambers are refractory lined and the latter are advantageously constructed with conical bottoms which serve as hoppers to feed the pebbles out of their respective chambers.

One of the important features of the invention is the control of temperature in the conversion zone through the regulation of temperature differential between points 5 and 6 therein and control of temperature differential in the preheating chamber between points 7 and 8. The rate of flow of the main pebble stream is regulated by variable speed motor 27 which is operated by temperature controller-recorder 28 in response to variations from a predetermined temperature differential between points 7 and 8 in preheating chamber 13. Thermocouples (or other suitable temperature sensitive means) 34 and 35 located at points 7 and 8, respectively, register the temperature of the incoming feed at point 8 and the temperature of the outgoing pebbles at point 7. When the temperature differential between points 7 and 8 becomes too high, temperature-controller-recorder 28 slows down the speed of motor 27 which immediately decreases the flow rate of pebbles through preheater 13 and consequently reduces the temperature differential between points 7 and 8.

As an aid in maintaining a low temperature differential between points 7 and 8 in preheater 13 and thereby reducing thermal shock to the pebble stream, a separate stream of pebbles is withdrawn from the main stream at a suitable point such as at point 6 in reactor 12 and is conveyed through outlet 18 and chute 24 into elevator 25. The flow of this separate stream is controlled by variable speed motor 32 which is responsive to temperature-controller-recorder 33 connected to thermocouples (or other suitable temperature sensitive devices) 29 and 31 located at points 5 and 6, respectively. Any variation from a predetermined temperature differential between points 5 and 6 is reflected in a change in the speed of motor 32 and therefore in the rate at which pebbles are withdrawn from the main stream at point 6. By changing the rate at which this separate stream of pebbles is withdrawn from the main stream at point 6, a variation in the total amount of pebbles passing through the reaction chamber 12 is effected without affecting the pebble flow rate through preheater 13 and upsetting the differential established therebetween pebble outlet temperature and gas inlet temperature at points 7 and 8, respectively. Any increase in the flow rate of the auxiliary pebble stream taken off at point 6 will tend to increase the differential between gas and pebble temperatures at points 5 and 6 and likewise any decrease therein will obviously decrease said temperature differential.

Thus it is readily apparent that the control system of this invention provides for the maintenance of desirable temperature differentials between gas and pebbles in the conversion and preheating chambers without necessitating compensatory adjustment of one of the controls whenever the other makes an adjustment in pebble flow as is required by the invention referred to in application Serial No. 704,694. This invention also eliminates a considerable portion of the time lag involved in the reestablishing of predetermined temperature differentials when minor deviations due to operating variables occur.

Another method of control involves maintaining a predetermined constant flow rate of pebbles in either the main stream or in the auxiliary stream and varying the flow rate in the other stream to compensate for minor variable operating conditions usually attendant upon pebble heater processes. As an illustration, motor 27 may be operated at a suitable constant rate while motor 32 is operated at a variable rate to maintain a suitable predetermined temperature differential between gas at point 5 and pebbles at point 6 under the control of instrument 33.

It is also feasible to maintain a suitable predetermined constant flow rate in one stream of pebbles and regulate the other stream in response to variations in temperature differential between gas and pebbles at suitable selected points by means of a first differential temperature-controller-recorder with auxiliary control from a second similar instrument in communication with another pair of points in the gas and pebble streams. Under such a control system, e. g., motor 27 is operated at a suitable constant speed and motor 32 is operated by TCR33 in response to variations from a predetermined temperature differential between points 5 and 6; but TCR28 in communication with points 7 and 8 communicates with TCR33 to effect a resetting of the instrument when required to reestablish the desired temperature differential between points 7 and 8.

Other arrangements of the apparatus shown are feasible. Some installations utilize a single long chamber having a pebble heating zone in the upper end, a feed preheating zone in the lower end, and a conversion zone intermediate thereof. In such a system, intermixing of gases is prevented to a large extent by proper control of pressures. The temperature control system of the invention is also applicable to this type of pebble heater installation.

Other modifications in the temperature control system are feasible. Temperature-controller-recorder 28 may be connected to a valve in throat 14 between chambers 11 and 12 and thereby regulate the main flow of pebbles into chamber 12. Likewise temperature-controller-recorder 33 may connect to a valve or pebble feeder device in chute 24. However, control of pebble flow by variable speed conveyer drivers is preferred.

The system shown in Figure 1 operates most advantageously at gas pressures of .5 to 6 p. s. i. g., but other pressures above and below atmospheric may be utilized. In order to prevent escape of gases to various chambers steam lines 44, 45, 46, 47, 48 and 49 may be utilized to form a steam block in the zones to which they lead. Other non-deleterious gases may be introduced through these lines to prevent mixing of feed and combustion gases.

The graphs of Figures 2 and 3 clearly illustrate the advantage in temperature control obtained by operating according to the invention. Temperature-enthalpy lines are shown for both hydrocarbon and pebble streams in a typical hydrocarbon cracking operation. Figure 2 represents operation in which there is no step-wise withdrawal of pebbles, while Figure 3 represents operation where pebbles are withdrawn in a separate stream from the lower portion of the conversion chamber. In Figure 2, the temperature-enthalpy line of the pebble stream is shown as AB, and that for the hydrocarbon as CD. An initial temperature difference $\Delta T-e$ is selected so that a desirable $\Delta T-f$ is obtained at the beginning of the cracking reaction. It is apparent that this results in a larger $\Delta T-g$ than is required for efficient preheating of the feed and produces undue thermal strain on the exterior surface of the pebbles.

In Figure 3, line 9—5—8 represents the temperature-enthalpy relation of the fluid stream as it passes from point 8 to point 5 to point 9 in the system shown in Figure 1. Line 4—6—7 represents the temperature-enthalpy relation of the pebble stream in its passage from point 4 through point 6, to point 7 of Figure 1. A side stream of pebbles is withdrawn at point 6. $\Delta T(4-9)$ is the same as $\Delta T-e$, and $\Delta T(6-5)$ is the same as $\Delta T-f$; but it can be readily seen that $\Delta T(7-8)$ is considerably smaller than $\Delta T-g$. In other words, utilizing the same differential between pebble inlet temperature and product outlet temperature from the reaction zone and the same temperature differential between inlet feed gas and outlet pebble temperature in the reaction zone, the invention provides a method of operating with a much lower temperature differential between the pebble and fluid streams in the lower portion of the preheating chamber. This feature of our invention permits better utilization of heat and less pebble breakage than is obtained in conventional operation.

In a typical utilization of our invention, a feed stock having the following composition by weight per cent:

| | |
|---|---|
| Methane | 2.6 |
| Ethane | 21.6 |
| Propane | 74.5 |
| Butanes and heavier | 1.3 | is processed in apparatus arranged according to Figure 1 to produce an olefin-rich gas of the following composition by weight per cent:

| | |
|---|---|
| Hydrogen | 2.1 |
| Methane | 21.0 |
| Ethylene | 36.5 |
| Ethane | 13.4 |
| Propylene | 9.4 |
| Propane | 7.7 |
| Butanes and heavier | 9.9 | under the following temperature conditions:

| | °F. |
|---|---|
| Feed at 8 (Figure 1) | 100 |
| Feed preheat at 5 | 1,200 |
| Product at 9 | 1,700 |
| Gas entering line 36 | 3,600 |
| Flue gas, line 37 | 600 |
| Pebbles at 4 | 1,900 |
| Pebbles at 6 | 1,400 |
| Pebbles at 7 | 400 |

A relatively constant feed rate of 68,625 cu. ft. per hour is maintained with a production of 122,917 cu. ft. of product gas using ⅜ inch dense high purity alumina pebbles. The main pebble stream at point 6 is divided, a side stream being taken off and reintroduced in pebble heater 11 at a temperature point approximately that of the pebbles being introduced. Pebble flow in the two streams is regulated automatically by controls 33 and 28 to maintain relatively uniform temperature differentials of 200° F. between points 5 and 6 and 300° F. between points 7 and 8. Pebble breakage due to thermal stresses is considerably reduced over pebble breakage resulting from operation in which higher differentials obtain.

It can readily be seen that the invention results in more efficient utilization of heat than is obtained in conventional pebble heater operation, with less thermal shock and physical strain on the pebbles. Moreover, the invention decreases the time lag in effecting reestablishment of temperature differentials and effects substantially more uniform temperature conditions in both the reaction chamber and the preheating chamber than are possible without this type of control.

Operation according to the invention is not limited to the specific temperatures recited in the example. Conversion temperatures may be varied from about 1300° to about 3000° F. with correspondingly varied pebble temperatures. Temperature differentials between the gases being processed and pebbles may likewise be varied to suit the particular type of process involved. When highly endothermic reactions are being conducted in the conversion chamber temperature differential therein between pebbles entering and products leaving the chamber is desirably higher and may be of the order of about 300° to about 600° F. In processes requiring slower rates of heat transfer temperature differentials may be as low as 100° F.

Various modifications of the invention will become apparent to those skilled in the art. The illustrative details disclosed are not to be construed as imposing unnecessary limitations on the invention which is limited only by the appended claims.

We claim:

1. A continuous process for effecting thermal reactions at elevated temperatures in the vapor phase which comprises continuously flowing by gravity a contiguous fluent mass of hot refractory pebbles through a series of substantially vertically extending zones comprising from highest to lowest a pebble heating zone, a reaction zone, and a feed preheating zone, and several relatively narrow connecting zones for permitting free flow of pebbles between said first-named zones, all of said zones being substantially filled with said pebbles; continuously contacting that portion of said mass of pebbles in said pebble heating zone with a stream of hot combustion gas, thereby heating said pebbles to a temperature substantially above a predetermined reaction temperature; continuously contacting that portion of said mass of pebbles in said preheating zone with a stream of feed gas to be reacted, thereby preheating said gas a substantial amount; continuously passing the thus preheated feed gas into said reaction zone and there contacting that portion of said mass of pebbles in said zone with said preheated feed gas, thereby heating and reacting said feed gas a controlled amount; continuously transferring pebbles from the lower portion of said preheating zone to the upper portion of said pebble heating zone at a rate controlled to maintain a predetermined temperature differential between the inlet gas temperature and outlet pebble temperature in the feed preheating zone; simultaneously withdrawing pebbles from the lower portion of said reaction zone at a rate controlled to maintain a predetermined temperature differential between feed gas inlet temperature and pebble outlet temperature in the reaction zone, thereby maintaining a predetermined reaction temperature; introducing the pebbles thus withdrawn to the pebble heating zone; and continuously recovering effluents from the reaction zone.

2. A continuous process for effecting conversion of hydrocarbons in the vapor phase which comprises continuously flowing by gravity a contiguous fluent mass of hot refractory pebbles through a series of substantially vertically extending zones comprising from highest to lowest a pebble heating zone, a conversion zone, and a hydrocarbon preheating zone, and several relatively narrow connecting zones for effecting relatively free flow of pebbles between said first-named zones, all of said zones being substantially filled with said pebbles; continuously contacting that portion of said mass of pebbles in said pebble heating zone with a stream of hot combustion gas thereby heating said pebbles to a temperature substantially above a predetermined conversion temperature; continuously contacting that portion of said mass of pebbles in said preheating zone with a hydrocarbon vapor stream to be converted, thereby preheating said hydrocarbon stream a substantial amount; continuously passing the thus preheated hydrocarbon stream into said conversion zone and there counter-currently contacting that portion of said mass of pebbles in said zone with said preheated hydrocarbon stream thereby effecting desirable conversion of said hydrocarbons; continuously transferring pebbles from the lower portion of said preheating zone to the upper portion of said pebble heating zone at a rate regulated to maintain a predetermined temperature differential between inlet vapor temperature and outlet pebble temperature in the hydrocarbon preheating zone; continuously withdrawing pebbles from the lower portion of said conversion zone in a separate stream at a rate regulated to maintain a predetermined temperature differential between hydrocarbon inlet temperature and pebble outlet temperature in the conversion zone, thereby maintaining a predetermined conversion temperature, and introducing the pebbles thus withdrawn to the pebble heating zone; and continuously recovering effluents from the conversion zone.

3. The process of claim 2 in which said separate stream of pebbles is introduced into said pebble heating zone at a pebble temperature point substantially the temperature of the pebbles being introduced.

4. A continuous process for effecting thermal treatment of gases at elevated temperatures which comprises continuously flowing by gravity a fluent mass of hot refractory pebbles through a series of substantially vertically extending zones comprising from highest to lowest a pebble heating zone, a gas treating zone, and a gas preheating zone; continuously contacting that portion of said mass of pebbles in said pebble heating zone with a stream of hot combustion gas, thereby substantially heating said pebbles; continuously contacting that portion of said mass of pebbles in said preheating zone with a countercurrent stream of the gas to be treated, thereby preheating said gas a substantial amount; continuously contacting that portion of said mass of pebbles in said treating zone with a countercurrent stream of the thus preheated gas, thereby effecting the desired treatment of said gas; continuously transferring pebbles from the lower portion of said preheating zone to the upper portion of said pebble heating zone at a rate regulated to maintain a predetermined temperature differential between inlet gas temperature and outlet pebble temperature in the gas preheating zone; continuously withdrawing pebbles from the lower portion of said gas treating zone in a separate stream at a rate regulated to maintain a predetermined temperature differential between gas inlet temperature and pebble outlet temperature in the gas treating zone, thereby maintaining a predetermined gas treating temperature, and introducing the pebbles thus withdrawn to the pebble heating zone; and continuously recovering effluents from the gas treating zone.

5. A continuous process for effecting thermal treatment of gases at elevated temperatures which comprises continuously flowing by gravity a fluent mass of hot refractory pebbles through a series of substantially vertically extending zones comprising from highest to lowest a pebble heating zone, a gas treating zone, and a gas preheating zone; continuously contacting that portion of said mass of pebbles in said pebble heating zone with a stream of hot combustion gas, thereby substantially heating said pebbles; continuously contacting that portion of said mass of pebbles in said preheating zone with a countercurrent stream of the gas to be treated, thereby preheating said gas a substantial amount; continuously contacting that portion of said mass of pebbles in said treating zone with a countercurrent stream of the thus preheated gas, thereby effecting the desired treatment of said gas; continuously transferring pebbles from the lower portion of said preheating zone to the upper portion of said pebble heating zone at a controlled rate; continuously withdrawing pebbles from the lower portion of said gas treating zone in a separate stream at a controlled rate and introducing the pebbles thus withdrawn to the pebble heating zone; and continuously recovering effluents from the gas treating zone.

6. A continuous process for effecting thermal treatment of gases at elevated temperatures which comprises continuously flowing by gravity a fluent mass of hot refractory pebbles through a series of substantially vertically extending zones comprising from highest to lowest a pebble heating zone, a gas treating zone, and a gas preheating zone; continuously contacting that portion of said mass of pebbles in said pebble heating zone with a stream of hot combustion gas, thereby substantially heating said pebbles; continuously contacting that portion of said mass of pebbles in said preheating zone with a countercurrent stream of the gas to be treated, thereby preheating said gas a substantial amount; continuously contacting that portion of said mass of pebbles in said treating zone with a countercurrent stream of the thus preheated gas, thereby effecting the desired treatment of said gas; continuously transferring pebbles from the lower portion of said preheating zone to the upper portion of said pebble heating zone at a rate regulated to maintain a predetermined temperature differential between inlet gas temperature and outlet pebble temperature in the gas preheating zone; continuously withdrawing pebbles from the lower portion of said gas treating zone in a separate stream at a controlled rate and introducing the pebbles thus withdrawn to the pebble heating zone; and continuously recovering effluents from the gas treating zone.

7. A continuous process for effecting thermal treatment of gases at elevated temperatures which comprises continuously flowing by gravity a fluent mass of hot refractory pebbles through a series of substantially vertically extending zones comprising from highest to lowest a pebble heating zone, a gas treating zone, and a gas preheating zone; continuously contacting that portion of said mass of pebbles in said pebble heating zone with a stream of hot combustion gas, thereby substantially heating said pebbles; continuously contacting that portion of said mass of pebbles in said preheating zone with a countercurrent stream of the gas to be treated, thereby preheating said gas a substantial amount; continuously contacting that portion of said mass of pebbles in said treating zone with a countercurrent stream of the thus preheated gas, thereby effecting the desired treatment of said gas; continuously transferring pebbles from the lower portion of said preheating zone to the upper portion of said pebble heating zone at a controlled rate; continuously withdrawing pebbles from the lower portion of said gas treating zone in a separate stream at a rate regulated to maintain a predetermined temperature differential between gas inlet temperature and pebble outlet temperature in the gas treating zone, thereby maintaining a predetermined gas treating temperature, and introducing the pebbles thus withdrawn to the pebble heating zone; and continuously recovering effluents from the gas treating zone.

8. A continuous process for cracking hydrocarbons at elevated temperatures in gas or vapor phase which comprises continuously flowing by gravity a contiguous fluent mass of hot refractory pebbles through a series of substantially vertically extending zones comprising from highest to lowest a pebble heating zone, a cracking zone, and a hydrocarbon preheating zone each substantially filled with said pebbles; continuously contacting that portion of said mass of pebbles in said pebble heating zone with a stream of hot combustion gas, thereby heating said pebbles to a temperature substantially above a predetermined cracking temperature; continuously contacting that portion of said mass of pebbles in said preheating zone with a stream of hydrocarbon gas to be cracked, thereby preheating said stream a substantial amount; continuously passing the thus preheated hydrocarbon stream into said cracking zone in contact with that portion of said mass of pebbles therein, thereby heating and cracking said hydrocarbon stream a controlled amount; maintaining said predetermined cracking temperature in said cracking zone by continuously withdrawing a separate stream of pebbles from the lower portion of said cracking zone at a rate responsive to variations in temperature differential between inlet gas temperature and outlet pebble temperature in said cracking zone; maintaining a predetermined temperature differential between inlet gas and outlet pebbles in the preheating zone by removing a stream of pebbles from the lower portion of the preheating zone at a rate responsive to variations from said predetermined temperature differential; and continuously recovering effluents from said cracking zone.

9. The process of claim 8 in which said separate stream of pebbles is introduced into said pebble heating zone.

10. The process of claim 8 in which said separate stream of pebbles is introduced into said pebble heating zone at a pebble temperature point substantially the temperature of the pebbles being introduced.

11. In an apparatus for conversion of hydrocarbons at elevated temperatures by contact with a stream of hot pebbles, the combination of a heating chamber for heating pebbles with heat of fuel combustion; supply and discharge means leading to and from said heating chamber for flow of fuel thereto and combustion gas therefrom; a conversion chamber for converting hydrocarbons to desired products disposed at a lower level than said pebble heating chamber; supply and discharge means leading to and from said conversion chamber for flow of hydrocarbons thereto and conversion products therefrom; a hydrocarbon preheating chamber disposed at a lower level than said conversion chamber; supply and discharge means leading to and from said preheating chamber for flow of cool hydrocarbons thereto and preheated hydrocarbons therefrom, said discharge means being in communication with the supply means to said conversion chamber; conduit means connecting the several chambers for flow of pebbles from the highest to the lowest chamber in series; pebble outlet means in the lower portion of said preheating chamber and pebble inlet means in the upper portion of said heating chamber; means for transferring pebbles from said pebble outlet means to said pebble inlet means; means for actuating said pebble transferring means at variable rates responsive to temperature differential between selected points in said preheating chamber; pebble outlet means in the lower portion of said conversion chamber for removing a separate stream of pebbles from the main stream; pebble inlet means for introducing said separate pebble stream into the upper portion of said heating chamber; means for transferring said separate pebble stream from said last-named pebble outlet means to said last-named pebble inlet means; and means for actuating said last-named pebble transferring means at variable rates responsive to temperature differential between selected points in said conversion chamber.

12. In an apparatus for conversion of gases at elevated temperatures by contact with a stream of hot pebbles, the combination of a heating chamber for heating pebbles with heat of fuel combustion; supply and discharge means leading to and from said heating chamber for flow of fuel thereto and combustion gas therefrom; a conversion chamber for converting said gases to desired products disposed at a lower level than said pebble heating chamber; supply and discharge means leading to and from said conversion chamber for flow of gases thereto and conversion products therefrom; a gas preheating chamber disposed at a lower level than said conversion chamber; supply and discharge means leading to and from said preheating chamber for flow of cool gases thereto and preheated gases therefrom, said discharge means being in communication with the supply means to said conversion chamber; conduit means connecting the several chambers for flow of pebbles from the highest to the lowest chamber in series; pebble outlet means in the lower portion of said preheating chamber and pebble inlet means in the upper portion of said heating chamber; means for transferring pebbles from said pebble outlet means to said pebble inlet means; means for actuating said pebble transferring means at variable rates responsive to temperature differential between selected points in said preheating chamber; pebble outlet means in the lower portion of said conversion chamber for removing a separate stream of pebbles from the main stream; pebble inlet means for introducing said separate pebble stream into the upper portion of said heating chamber; means for transferring said separate pebble stream from said last-named pebble outlet means to said last-named pebble inlet means; and means for actuating said last-named pebble transferring means at variable rates responsive to temperature differential between selected points in said conversion chamber.

13. In an apparatus for conversion of hydrocarbons at elevated temperatures by contact with a stream of hot pebbles, the combination of a heating chamber for heating pebbles with heat of fuel combustion; supply and discharge means leading to and from said heating chamber for flow of fuel thereto and combustion gas therefrom; a conversion chamber for converting hydrocarbons to desired products disposed at a lower level than said pebble heating chamber; supply and discharge means leading to and from said conversion chamber for flow of hydrocarbons thereto and conversion products therefrom; a hydrocarbon preheating chamber disposed at a lower level than said conversion chamber; supply and discharge means leading to and from said preheating chamber for flow of cool hydrocarbons thereto and preheated hydrocarbons therefrom, said discharge means being in communication with the supply means to said conversion chamber; conduit means connecting the several chambers for flow of pebbles from the highest to the lowest chamber in series; pebble outlet means in the lower portion of said preheating chamber and pebble inlet means in the upper portion of said heating chamber; means for transferring pebbles from said pebble outlet means to said pebble inlet means; means for actuating said pebble transferring means at variable rates; pebble outlet means in the lower portion of said conversion chamber for removing a separate stream of pebbles from the main stream; pebble inlet means for introducing said separate pebble stream into the upper portion of said heating chamber; means for transferring said separate pebble stream from said last-named pebble outlet means to said last-named pebble inlet means; and means for actuating said last-named pebble transferring means at variable rates.

BERNARDO J. FERRO, JR.
J. FRANK CHURCH.

REFERENCES CITED

The following references are of record in the file of this patent:

UNITED STATES PATENTS

| Number | Name | Date |
|---|---|---|
| 2,374,151 | Wolk et al. | Apr. 17, 1945 |
| 2,387,378 | Wolk | Oct. 23, 1945 |